(12) United States Patent
Duffet et al.

(10) Patent No.: US 9,926,070 B2
(45) Date of Patent: Mar. 27, 2018

(54) TURBINE ENGINE HAVING A PAIR OF PROPELLERS FOR AN AIRCRAFT

(71) Applicant: SNECMA, Paris (FR)

(72) Inventors: Jean-Christophe Duffet, Saint-Meade (FR); Tewfik Boudebiza, Paris (FR); Augustin Curlier, Melun (FR)

(73) Assignee: SNECMA, Paris (FR)

( * ) Notice: Subject to any disclaimer, the term of this patent is extended or adjusted under 35 U.S.C. 154(b) by 382 days.

(21) Appl. No.: 14/612,661

(22) Filed: Feb. 3, 2015

(65) Prior Publication Data

US 2015/0217854 A1 Aug. 6, 2015

(30) Foreign Application Priority Data

Feb. 3, 2014 (FR) ..................... 14 00285

(51) Int. Cl.
*F01D 13/00* (2006.01)
*B64C 11/30* (2006.01)
(Continued)

(52) U.S. Cl.
CPC .......... *B64C 11/306* (2013.01); *B64C 11/308* (2013.01); *F02C 3/067* (2013.01);
(Continued)

(58) Field of Classification Search
CPC ...... B64C 11/306; B64C 11/308; F02C 6/206; F02C 3/067; B64D 2027/005
(Continued)

(56) References Cited

U.S. PATENT DOCUMENTS 3,994,128 A * 11/1976 Griswold, Jr. ........ F04D 29/323
 416/153
4,657,484 A * 4/1987 Wakeman ............. B64C 11/306
 415/130
(Continued)

FOREIGN PATENT DOCUMENTS

FR 2 980 770 A1 4/2013

OTHER PUBLICATIONS

French Preliminary Search Report dated Oct. 10, 2014, in Patent Application No. FR 1400285, filed Feb. 3, 2014 (with English Translation of Category of Cited Documents).

*Primary Examiner* — Umashankar Venkatesan
(74) *Attorney, Agent, or Firm* — Oblon, McClelland, Maier & Neustadt, L.L.P.

(57) ABSTRACT

An engine includes systems for changing the pitch of propeller blades, a system for an upstream propeller including a linear actuator and a transmission mechanism connecting the actuator to the blades to transform the sliding of the actuator into a rotation of the blades, the upstream propeller including a rotatable housing rigidly connected to a rotatable shaft supported in a static housing of the turbine engine by an upstream bearing and by a downstream bearing. The rotatable housing of the upstream propeller includes a support rigidly connected to the rotatable housing and surrounding the static housing. The actuator is annular and fixed outside to the support, the transfer mechanism includes connecting rods and rotatable radial arms traversing the gaseous flow path, and the downstream bearing is radially located between the static housing and the support.

10 Claims, 2 Drawing Sheets

(51) Int. Cl.
*F02C 3/067* (2006.01)
*F02C 6/20* (2006.01)
*B64D 27/00* (2006.01)

(52) U.S. Cl.
CPC ........ *F02C 6/206* (2013.01); *B64D 2027/005* (2013.01); *Y02T 50/66* (2013.01); *Y02T 50/672* (2013.01)

(58) Field of Classification Search
USPC .......................................................... 416/130
See application file for complete search history.

(56) References Cited

U.S. PATENT DOCUMENTS

| | | | | |
|---|---|---|---|---|
| 4,890,979 | A * | 1/1990 | Ames | B64C 11/325 416/153 |
| 5,090,869 | A * | 2/1992 | Wright | B64C 11/306 416/127 |
| 9,051,044 | B2 * | 6/2015 | Talasco | B64C 11/306 |
| 9,085,979 | B2 * | 7/2015 | Balk | B64C 11/306 |
| 9,376,202 | B2 * | 6/2016 | Szymandera | B64C 11/308 |
| 2009/0311100 | A1 * | 12/2009 | Gallet | B64C 11/32 416/159 |
| 2011/0164998 | A1 * | 7/2011 | Swift | B64C 11/308 417/374 |
| 2014/0017086 | A1 * | 1/2014 | Charier | B64C 11/308 416/128 |
| 2014/0294585 | A1 * | 10/2014 | Escure | B64C 11/385 416/147 |
| 2015/0217854 | A1 * | 8/2015 | Duffet | B64C 11/308 416/129 |
| 2016/0368592 | A1 * | 12/2016 | Szymandera | B64C 11/308 |

* cited by examiner

TURBINE ENGINE HAVING A PAIR OF PROPELLERS FOR AN AIRCRAFT

BACKGROUND OF THE INVENTION

Field of the Invention

The present invention relates to the field of turbine engines having a pair of coaxial and contrarotating propulsion propellers for an aircraft, designated by the English expression "open rotor", and more particularly to an arrangement of the system for changing the pitch of the blades of the upstream propeller in order to decrease the forces exerted on one of the bearings of such a turbine engine.

Description of the Related Art

It is known that the architecture of "open rotor" turboshaft engines differs from that of the usual turbojet engines in that the fan is no longer internal but external and that it is composed of two coaxial and contrarotating propellers which can be situated downstream, as is the case here, or upstream of the gas generator. Such an architecture results in lower consumption of fuel by comparison with the multi-flow turbojet engines in use on commercial aircraft.

The turboshaft engine 1 having a pair of upstream 2 and downstream 3 contrarotating propellers, represented schematically on FIG. 1, includes principally, along a central longitudinal axis A and with the air flow F circulating in the turboshaft engine from upstream to downstream, a gas generator unit 4, a propulsion unit 5 with the pair of contrarotating propellers 2, 3 constituting the unducted fan ("open rotor") and, between the generator and the propellers, a unit 6 for transmitting the power delivered by the generator 4 in the direction of the propellers.

In particular, the gas generator unit 4 is situated inside a fixed cylindrical nacelle 7 carried by the structure of the aircraft (such as the rear part of the fuselage of an aeroplane), and it usually includes, depending upon the directions of the gas flows F entering the nacelle 4 and depending upon the architecture of the gas generator having a single or double body, one or two compressors 8, an annular combustion chamber 9, and one or more turbines 10 at different pressures.

The intermediate unit 6 downstream of the gas generator unit includes a power turbine 11 and a speed reduction device or epicyclic reduction gears 12 (usually designated by the English acronym PGB for power gear box). The rotor of the turbine 11 bears radial blades 13 which are traversed and driven in rotation by the hot air flow path F leaving the turbines of the gas generator unit 4. Between the rotatable blades 13 are located fixed blades (not shown) which are connected to a fixed housing 14 of the turbine engine 1, the flow path F circulating between the housing 14 and the rotor of the turbine 11.

The rotatable shaft 15 of the power turbine 11 is rigidly connected to a planetary input shaft 16 of the reduction gear 12 of which the planet carrier and the toothed ring (not shown) drive, in inverse rotation to one another, two concentric output shafts, respectively an external output shaft 17 and an internal output shaft 18, which are rigidly connected to the respective rotating housings 19, 20 of the upstream propeller 2 and the downstream propeller 3 of the propulsion unit 5.

In operation and briefly, the air flow F circulating in the assembly 4 of the turboshaft engine 1 is compressed, then mixed with fuel and burnt in the combustion chamber 9. The combustion gases of the flow which are produced in this way then pass into the turbines 10 in order to drive in inverse rotation, via the power turbine 11 and the epicyclic reduction gear 12 of the intermediate unit 6, the propellers 2, 3 which supply most of the thrust. The combustion gases are expelled through the nozzle 21, increasing the thrust of the turboshaft engine 1.

Moreover, a system 22 for changing the pitch of the blades 2A, 3A of each propeller is provided in order to vary the setting of the blades depending on the different phases of operation of the turbine engine, that is to say of the aeroplane in flight and on the ground. Only the system 22 linked to the upstream propeller 2, relating to the present invention, will be described here.

As shown in FIG. 2, the system 22 for changing the pitch of the blades for the upstream propeller 2 of the turboshaft engine 1, representing the prior art, includes an annular linear actuator 23 and a transmission mechanism 24 connecting the actuator to the pivot axes 25 of the blades 2A, of which the purpose is to transform the sliding of the linear actuator 23 into a rotation of the pivot axes 25 of the blades. The linear actuator 23 is rigidly connected by its fixed part 26 to an upstream static housing 27 of the turbine engine and is therefore fixed in rotation, and it surrounds the concentric drive shafts 17, 18 of the propellers. The sliding movable part 28 of the actuator is connected to the transmission mechanism 24, as will be seen below.

Bearings are also provided in order to ensure the operation of such a propulsion unit 5 of the turboshaft engine, in particular between the static housing 27 of the turboshaft engine and the contrarotating shafts 17, 18 of the propellers.

Thus a bearing 29 is arranged on the upstream side of the actuator 23 of said system 22, between the static housing 27 of the turbine engine and the end of the drive shaft 17 of the upstream propeller, and is connected to the planet carrier of the reduction gear 12. A bearing 30 is provided on the downstream side of the actuator of said system 22, between the fixed part 26 of the actuator, which is rigidly connected to the static housing 27, and the shaft 17 of the upstream propeller, which is rigidly connected to the rotatable housing 19 of said propeller. Another bearing 31 is also provided, substantially vertically above the upstream bearing 29, at the output of the reduction gear 12, between the two concentric and contrarotating control shafts 17, 18 of the upstream propeller 2 and the downstream propeller 3.

The transmission mechanism 24 includes a transfer bearing 32 which surrounds the sliding part 28 of the linear actuator 23, by its internal ring linked to the sliding part. The bearing 32 makes it possible, by means of respective connecting rods 33 which connect the external ring of said transfer bearing 32 to radial arms 34 rigidly connected to the pivot axes 25 of the blades, to transform the movement in translation of the sliding part 28 of the actuator 23 into a rotation of the blades 2A of the propeller according to the phases of operation of the aircraft. A fluid supply device (not shown) which is connected to a hydraulic power source (not shown) is fixed to the static housing and communicates with the linear actuator in order to control it.

When it is controlled by the fluid supply device, such a system 22 for changing the pitch of the blades of the upstream propeller 2 generates a torque of which the force loop B thus generated is represented by a chain-dotted line on FIG. 2. In the illustrated arrangement according to the prior art, the loop B passes in particular through the movable part of the actuator and the connecting mechanism of the system for changing pitch, through the rotatable housing of the upstream propeller and the drive shaft, and through the upstream bearing and the static housing in order to return to the actuator.

Thus this force loop B transits through the rotatable and static housings and therefore through the upstream bearing 29 (generally a ball bearing serving in particular as an axial abutment) arranged between the static housing and the rotary shaft of the upstream propeller, which extends the force loop. It is also known that the forces coming from the actuator may be very substantial depending upon the different points or phases of operation of the engine, and they are then added to the other force components usually borne by the upstream bearing, so that this bearing can be loaded up to a value greater than 20000 DaN, that is to say several times the usual load which it bears.

Oversizing of the bearing may then be a solution, but this gives rise to problems of size in an internal space which is already confined, and an increase in mass.

BRIEF SUMMARY OF THE INVENTION

The object of the present invention is to remedy these drawbacks and to propose a new arrangement in order to control the pitch of the blades of the upstream propeller and thus to avoid overloading of the bearing in question.

To this end, the turbine engine having a pair of contrarotating upstream and downstream coaxial propellers for an aircraft, includes respective systems for changing the pitch of the propeller blades, the system for the upstream propeller including a linear actuator which is movable along the axis of the propeller and a transmission mechanism connecting the actuator to the blades in order to transform the sliding of the actuator into a rotation of the blades, said upstream propeller including a rotatable housing rigidly connected to a shaft for driving in rotation supported in a static housing of the turbine engine by a bearing upstream of the system, and by a bearing downstream of the system.

According to the invention, the turbine engine is remarkable in that:
  the rotatable housing of the upstream propeller includes a support rigidly connected to said rotatable housing and surrounding an end part of the static housing,
  the actuator of the system for changing pitch is annular and fixed to the support of the rotatable housing, outside the support, with the transfer mechanism of the system comprising connecting rods and rotatable radial arms radially traversing the gaseous flow path in order to control the pitch of the blades, and
  the downstream bearing is provided between the static housing and the support, inside the support.

Thus, by virtue of the invention, as the linear actuator is then rotatable since it is mounted on the support of the rotatable housing of the propeller, it is therefore independent of the static housing in such a way that the upstream bearing, arranged between the static housing and the drive shaft of the housing of the upstream propeller, is relieved of the forces generated by the actuator.

Consequently, the force loop produced by the actuator during its operation no longer transits through the static housing or through the upstream bearing, as said upstream bearing only bears the components to which it is usually subjected, but the loop then passes in particular through the transfer mechanism of the system and the rotatable housing of the propeller. This force loop not only spares the upstream bearing but is shorter since the actuator and the transfer mechanism are connected to the sole rotatable housing of the upstream propeller, especially since the radial arms of the transfer mechanism are themselves rendered rotatable by the action of the connecting rods, within the gas flow path, in order to drive the pivoting of the blades situated outside the flow path. The control of the setting of the blades by rotating radial arms from the rotatable housing part situated below the passage of the gaseous flow path makes it possible to reduce the space required for said arms when the control of the blades is performed by sliding arms, which are fixed in rotation, connected to the blades in the region of the rotatable housing part situated outside the flow path.

For example, the support takes the form of a cylindrical plate, of annular cross-section, attached or rigidly connected to the rotatable housing of the upstream propeller and projecting laterally from said rotatable housing and surrounding the cylindrical end part of the static housing by means of the downstream bearing.

Moreover, as the linear actuator is rotatable, a specific fluid supply device of the actuator is provided between the static housing and the rotating cylindrical support of the upstream propeller, bearing said actuator, in such a way as to ensure the change of markers between the static housing and the rotatable support for the passage of the supply fluid towards the actuator.

Advantageously, the fluid supply device and the downstream bearing are arranged side by side between the static housing and the interior of the support, with the device vertically above the linear actuator and the bearing to the side of the device between said actuator and the rotatable housing of the upstream propeller, the actuator being mounted by its fixed part on the exterior of the support. Equally, the linear actuator is situated substantially vertically above the pivot axes of the blades. Thus, note will be taken of the compactness of the arrangement of the system for changing the pitch of the blades, which is rigidly connected to the rotatable housing and substantially vertically above the blades whilst being radially close to the shafts and therefore to the longitudinal axis of the turbine engine.

In a preferred embodiment, the supply device comprises an internal cylindrical part mounted so as to be rigidly connected to the static housing, and an external cylindrical part arranged concentrically with the internal part and rigidly connected to the rotatable support, between the two components being formed by sealing means, two independent adjacent chambers connected, for the internal part, to fluid supply lines and, for the external part, to respective chambers of the actuator.

In particular, said cylindrical parts are, on the one hand, in axial abutment against respective shoulders of the end part of the static housing and of the support of the rotatable housing, and, on the other hand, immobilised by respective lock nuts.

Preferably, the sealing means between the two cylindrical parts delimiting the two chambers adjacent to the supply device comprise composite double dynamic seals.

BRIEF DESCRIPTION OF THE SEVERAL VIEWS OF THE DRAWINGS

The figures of the appended drawings will enable a good understanding of how the invention can be carried out. In these drawings, identical reference numerals designate similar elements.

DETAILED DESCRIPTION OF THE INVENTION

Figure 3:
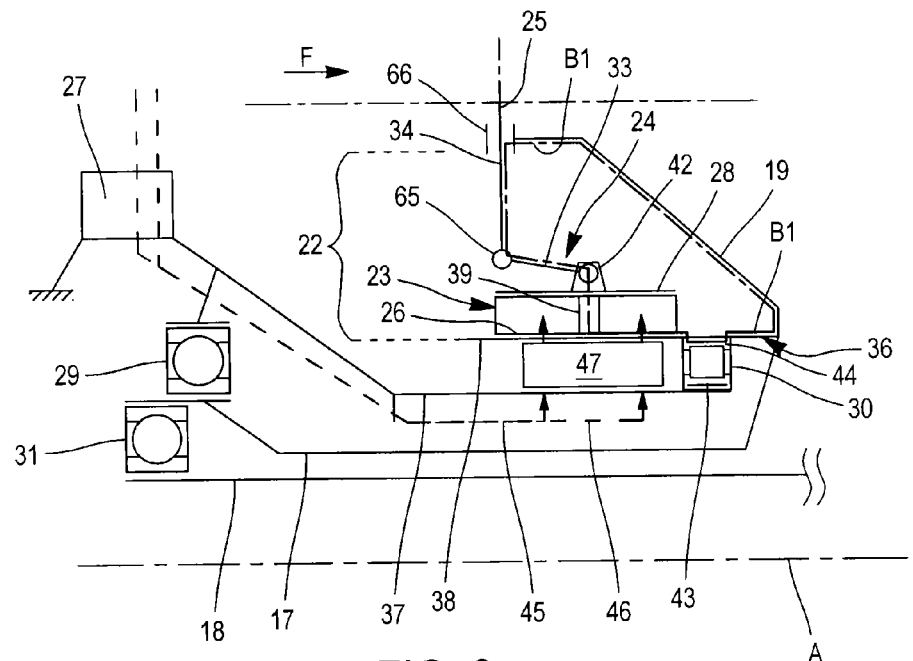
FIG. 3 is a partial schematic view in longitudinal section of the turboshaft engine described above and shows the arrangement according to the invention between the rotatable housing of the upstream propeller, the static housing, the system for changing the pitch and the bearings for mounting between the static housing and the propeller.

The representation illustrated with regard to FIG. 3 shows, radially from the axis A, the internal drive shaft 18 of the rotatable housing of the downstream propeller, the external drive shaft 17 of the rotatable housing 19 of the upstream propeller 2 with the inter-shaft bearing 31 on the reduction gear side, and the static structural housing 27 enclosing the external shaft 17 with the upstream bearing 29, such as a thrust ball bearing, arranged therebetween.

Figure 1:
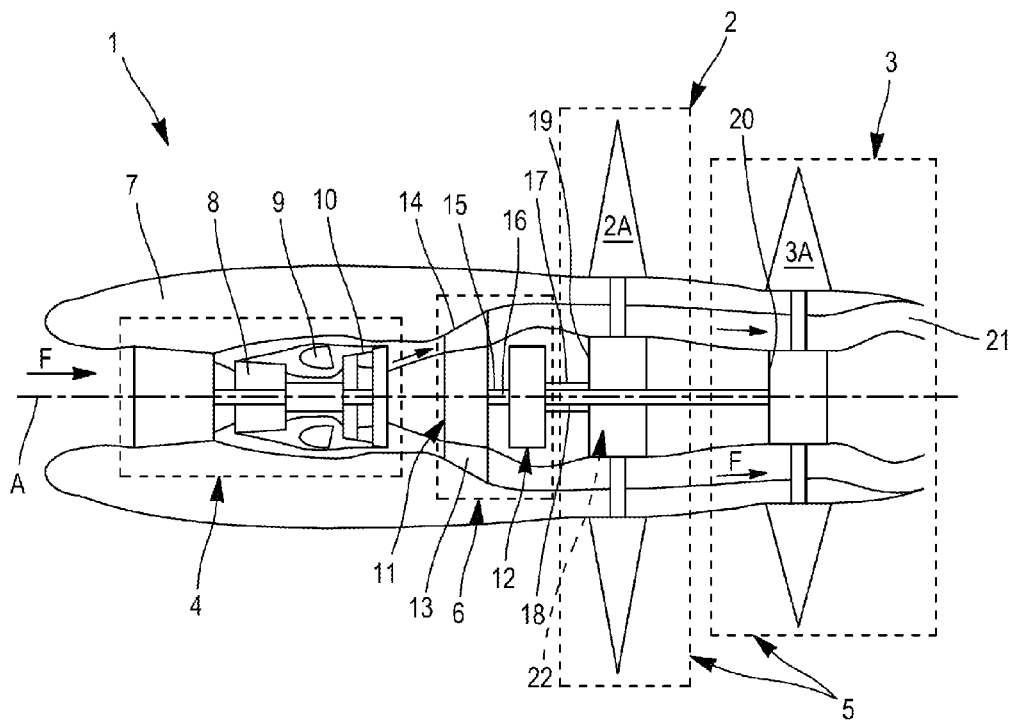
FIG. 1 is a schematic view, in longitudinal section, of a turbine engine having a pair of contrarotating propellers, such as an "open rotor" turboshaft engine described above.
Figure 2:
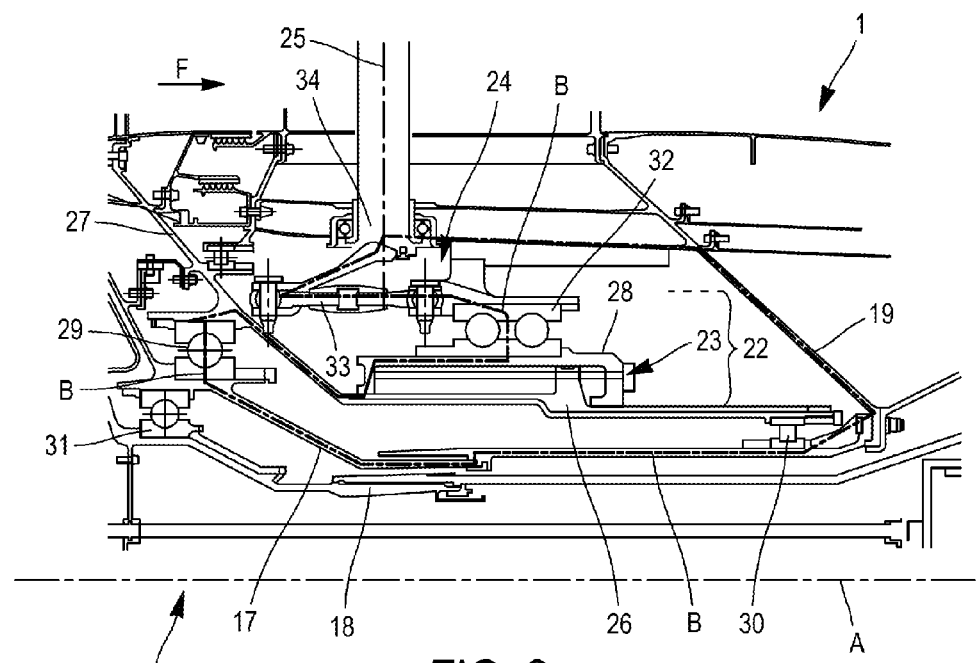
FIG. 2 is a partial schematic view in longitudinal section of the turboshaft engine described above and shows the arrangement according to the prior art between the rotatable housing of the upstream propeller, the static housing, the system for changing the pitch and the bearings for mounting between the static housing and the rotatable housing.

According to the invention, a support 36, which is situated around the cylindrical end part 37 of the static structural housing 27 and spaced radially from this part, projects laterally from the rotatable housing 19 of the upstream propeller. This support 37 is intended to receive the annular linear actuator 23 of the system for changing pitch 22 in order to render the actuator rotatable and independent of the static housing and thus to enable the forces which it generates during its operation to no longer pass through the upstream bearing 29 between the static and rotatable housings of the embodiment according to FIG. 2.

In the embodiment illustrated schematically with regard to FIG. 3, the support 36 takes the form of a cylindrical plate or sheet 38 of annular cross-section which may form an integral part of the rotatable housing or may be attached thereto by any appropriate fixing means (assembly by screws and the like, welding, etc.). The panel 38 is metallic and extends laterally along the axis A, from the rotatable housing 19 in the direction of the downstream bearing 30 and of the system 22, and it surrounds the cylindrical part 37 of the static housing 27 over a sufficient length in order to support the actuator 23.

This linear actuator 23 is an annular actuator of the hydraulic type with the fixed part 26 thereof which is mounted on the exterior surface of the plate 38 forming the support 36, being joined there axially and in rotation by any appropriate means. The sliding part (or movable body) 28 of the actuator is itself joined to the transmission mechanism 24 having connecting rods 33 and radial arms 34 of the system 22, and the rotation of the arms via themselves, as a result of the sliding of the actuator and of the connecting rods, transmits the rotation of the pivot axes 25 of the blades. The annular linear actuator 23 is therefore fixed in rotation with the rotatable housing of the upstream propeller.

Figure 4:
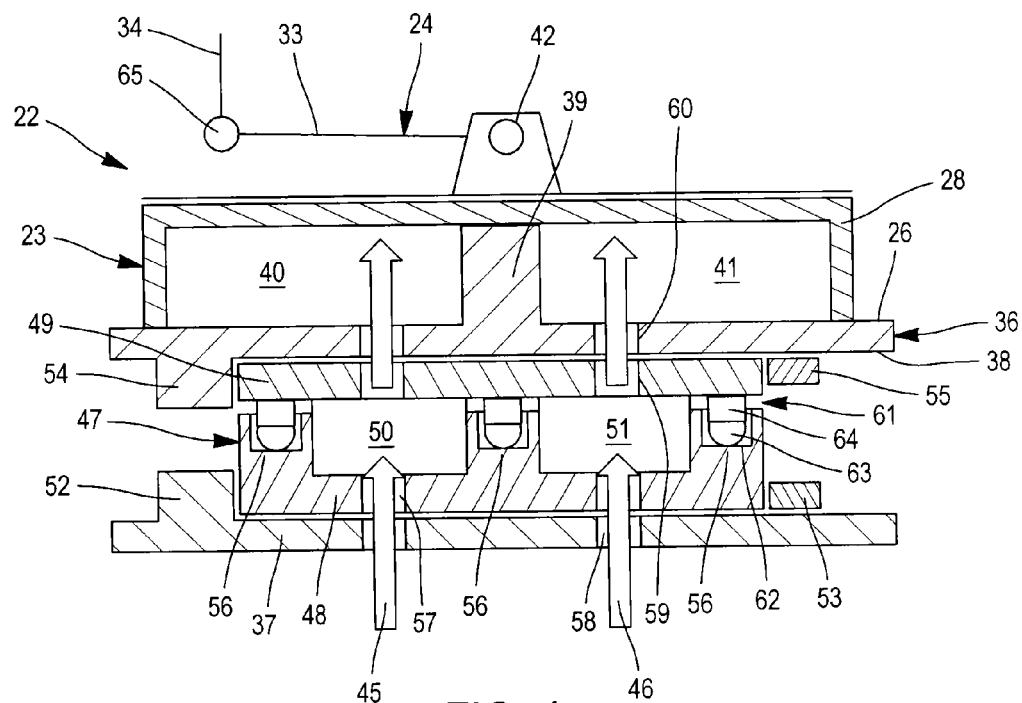
FIG. 4 shows an enlarged and longitudinal schematic view in longitudinal section of the oil supply device of the actuator of the system for changing pitch, from the static housing of the turbine engine.

In the representation illustrated with regard to FIGS. 3 and 4, the fixed part 26 and the sliding part 28 of the actuator mutually delimit, by means of a piston 39 rigidly connected to the fixed part, two adjacent and sealed chambers 40, 41.

The absence of the transfer bearing 32 of the preceding embodiment will be noted, since the linear actuator 23 is rigidly connected to the rotatable housing. Joints 42 then connect the sliding part 28 to one of the ends of the connecting rods 33. Joints 65 connect the other end of the connecting rods to the radial arms 34 which are mounted in radial bearings 66 of the rotatable housing, situated within the gas flow path F.

During the operation of the system 22, the action of the connecting rods 33 driven by the sliding actuator directly transmits the rotation of the radial arms 34 via themselves into the bearings 66, within the annular gas flow path F circulating in the turbine engine. The rotatable radial arms pass through the flow path and transmit their rotation to the pivot axes 25 of the blades housed, in the usual manner, in a polygonal ring (not shown) arranged at the periphery of the external housing of the propeller 2, outside the gas flow path.

The downstream roller bearing 30 is located between the annular plate 38 and the cylindrical end part 37 of the static housing 27. The internal ring 43 of said bearing is mounted at the end of the part 37 of the static housing and the external ring 44 co-operates by being retained axially there, with the internal surface of the annular plate 38 forming the support 36 of the rotatable housing.

In order to enable the supply of oil to the actuator 23, which is then rotatable, by the fluid source (not shown), and which is rigidly connected to the static housing 27 of which the supply/discharge lines are shown schematically at 45, 46 by broken lines, a supply device 47 with changing of markers is provided. This device 47 is designed in order to ensure the passage of the oil originating from the source and the lines 45, 46 of the static housing 27 (fixed marker) to the linear actuator 23 of the rotatable housing 19 (movable marker).

As shown in FIG. 3 and in greater detail in FIG. 4, the supply device 47 is arranged in the annular space between the plate 38 of the support 36 and the cylindrical end part 37 terminating the static housing 27, and is vertically above the annular actuator 23. It will be noted in FIG. 3 that the supply device 47 and the downstream bearing 30 are arranged side by side between the rotatable plate 38 and the static housing 27, together with the roller bearing 30 which is situated between the device 47 and the rotatable housing 19 of the upstream propeller 2. In addition to the compactness thus obtained, it will be noted that the plate of the support has the length necessary for mounting on the outside of the actuator and on the inside of the bearing and of the device, which also reduces the path of the force loop B1 as shown on FIG. 3.

According to the illustrated example, the oil supply device 47 comprises an assembly of two concentric cylindrical parts 48, 49 which delimit therebetween two sealed adjacent chambers 50, 51 communicating respectively with the lines 45, 46 and the corresponding adjacent chambers 40, 41 of the actuator 23.

In particular, the cylindrical part 48 is internal and is mounted around the cylindrical end part 37 of the static housing 27, being in axial abutment against an external annular shoulder 52 of the part 37, and being immobilised, in opposition to the abutment, by a clamping nut 53 screwed to the end of the part 37. The cylindrical part 49 is external and is mounted inside the plate 38 of the rotatable housing, being in axial abutment against an internal annular shoulder 54 of the plate 38, and being immobilised in opposition by a clamping nut 55 screwed into the plate.

Between the two cylindrical parts 48, 49 thus mounted are defined the two annular adjacent chambers 50, 51 delimited by three radial collars 56 formed, in this example, from the internal part 48.

Holes 57 are made in the wall of the internal part 48. They are in fluid communication, on the one hand, with orifices 58 made in the cylindrical part 37 of the static housing and to which the respective supply lines 45, 46 are connected, and on the other hand, with the chambers 50, 51 of the device 47.

Holes 59 are also made in the wall of the external part 49. They are in fluid communication on the one hand with the chambers 50, 51 and on the other hand with orifices 60 made in the support plate 38 and communicating with the respective chambers 40, 41 of the actuator 23. It will be noted in FIG. 4 that the plate 38 of the rotatable support and the fixed part 26 of the actuator are represented by the same part. Of course, the orifices 60 pass through the walls of the plate 38 and that of the fixed part 26 in order to open into the corresponding chambers of the actuator.

It will also be noted that the lines 45, 46 coming from the source run along inside the static housing 27 (FIG. 3) as far as the end part 37 thereof, between said end part and the drive shaft 17, which makes it possible to protect them from the external environment having the system 22 and the rotatable housing 19.

Sealing means 61 are provided between the fixed internal cylindrical part 48 and the rotatable external cylindrical part 49 in order to enable the changing of markers between said internal and external parts and, therefore, the fluid supply of the chambers of the device 47 and of the actuator 23.

These means 61 are defined by dynamic seals accommodated in annular grooves 62 provided in the three collars 56 of the internal part 48, and coming into contact with the wall of the external part 49.

In particular, the dynamic seals are double and composite. They are each composed of a first sealing element 63 in the form of a pretensioned O ring made of elastomer which is accommodated in the groove 62 of the collar 56, and around said collar, of a second external element 64 in the form of a more rigid ring. Said ring has appropriate properties of friction and of resistance to wear in order to guarantee maximum sealing during the rotation of the external part 49 rigidly connected to the rotatable housing 19 with respect to the internal part 48 rigidly connected to the static housing 27. Each ring 64 is, for example, produced partially or entirely from polytetrafluoroethylene.

Functionally, when the system 22 for changing the pitch of the blades 2A of the upstream propeller 2 is biased according to the current flight phase, one or the other of the chambers 40, 41 of the annular actuator 23 is supplied with oil under pressure by the corresponding chamber 50, 51 of the supply device 47 and drives the sliding, along the axis A, of the movable part 28 of the actuator. Simultaneously, the connecting rods 33 of the transmission mechanism 24 which are articulated to the sliding part 28 are pulled or pushed and, via the respective joints 65, impose a rotation on the radial arms 34, which leads directly to the concomitant rotation of the pivot axes 25 of the blades 2A of the upstream propeller 2 orienting the blades according to the setting required.

As the linear actuator 23 is rigidly connected to the rotatable housing 19 of the upstream propeller by the support 36 having a plate 38, the forces generated by the sliding of the movable part 28 pass through the rotatable housing 19 of the upstream propeller, without passing through the static housing 27 or through the upstream bearing 29, as shown by the loop B1 in FIG. 3. This loop B1 coming from the sliding part 28 of the actuator passes through the connecting rods 33 and the rotatable radial arms 34 of the mechanism 24, the rotatable housing 19 having its support 36, via the axially fixed external ring 44 of the downstream roller bearing 30, and the fixed part 26 of the actuator.

Thus no force passes through the static housing 27 and the upstream bearing 29, so that said bearing is not overloaded by forces other than those for which it is designed, by virtue of the actuator 23 rigidly connected to the rotatable housing 19 and of the supply device for changing of markers 47 between the static housing 27 of the turboshaft engine and the rotatable housing 19 of the upstream propeller 2.

The invention claimed is:

1. A turbine engine having a pair of contrarotating upstream and downstream coaxial propellers for an aircraft, including respective systems for changing a pitch of blades of the propellers, the system for the upstream propeller including a linear hydraulic actuator, a sliding movable part of which is movable along an axis of the propeller, a transmission mechanism connecting the actuator to the blades in order to transform sliding of the actuator into a rotation of the blades about axes thereof, and a rotatable housing rigidly connected to a shaft for driving in rotation said rotatable housing being supported in a static housing of the turbine engine by a bearing upstream of the system, and by a bearing downstream of the system, wherein: the rotatable housing of the upstream propeller includes a support receiving the linear actuator and rigidly connected to said rotatable housing and surrounding a cylindrical end part of the static housing, the linear hydraulic actuator of the system for changing pitch is annular and comprises a fixed part directly mounted to the support of the rotatable housing so as to be joined axially and in rotation thereto, outside the support, and the sliding part being joined to the transmission mechanism, said actuator being fixed in rotation with the rotatable housing, a piston of the linear hydraulic actuator is rigidly connected to the fixed part, said transmission mechanism of the system comprising connecting rods connected at first ends by first ball joints to the sliding movable part and at second ends by second ball joints to rotatable radial arms radially traversing a gaseous flow path in order to control the pitch of the blades, and the downstream bearing is radially located between the static housing and the support.

2. The turbine engine according to claim 1, wherein the downstream bearing, which is provided between the static housing and the support, is mounted inside the support.

3. The turbine engine according to claim 2, wherein the support includes a cylindrical plate, of annular cross-section, attached to or rigidly connected to the rotatable housing of the upstream propeller and extending laterally from said rotatable housing and surrounding the cylindrical end part of the static housing in the direction of the downstream bearing.

4. The turbine engine according to claim 1, wherein a pivot point of the blades is situated above the linear actuator.

5. The turbine engine according to claim 1, wherein a fluid supply device of the actuator is provided between the static housing and the support of the upstream propeller, and wherein said support bears said actuator.

6. The turbine engine according to claim 5, wherein the fluid supply device and the downstream bearing are arranged side by side between the static housing, and an interior of the support, the fluid supply device being vertically above the linear actuator, the downstream bearing being adjacent to the fluid supply device and being located between said actuator and the rotatable housing of the upstream propeller, the actuator being mounted by a fixed part thereof on an exterior of the support.

7. The turbine engine according to claim 5, wherein the fluid supply device comprises an internal cylindrical part rigidly connected to the static housing, and an external cylindrical part arranged concentrically with the internal cylindrical part and rigidly connected to the support, two independent chambers being formed between the internal cylindrical part and the external cylindrical part by sealing means, said chambers being connected, for the internal cylindrical part, to fluid supply lines and, for the external cylindrical part, to respective chambers of the actuator.

8. The turbine engine according to claim 7, wherein the fluid supply lines run along an interior of the static housing as far as the cylindrical end part thereof and communicate with the chambers of the fluid supply device.

9. The turbine engine according to claim 7, wherein said internal and external cylindrical parts are in axial abutment against respective shoulders of the static housing and of the support, and axially immobilized by respective clamping nuts.

10. The turbine engine according to claim 7, wherein the sealing means between the internal and external cylindrical parts delimiting the two chambers adjacent to the fluid supply device comprise composite double dynamic sealing joints.

* * * * *

UNITED STATES PATENT AND TRADEMARK OFFICE
CERTIFICATE OF CORRECTION

PATENT NO.         : 9,926,070 B2
APPLICATION NO.    : 14/612661
DATED              : March 27, 2018
INVENTOR(S)        : Jean-Christophe Duffet et al.

Page 1 of 1

It is certified that error appears in the above-identified patent and that said Letters Patent is hereby corrected as shown below:

On the Title Page

Item (72) Inventors, change "Saint-Meade (FR)" to --Saint-Mande (FR)--;

In the Claims

Column 8, Line 25, change "driving in rotation" to --driving in rotation,--; and Column 8, Line 41, change "first bail joints" to --first ball joints--.

Signed and Sealed this
Twenty-first Day of April, 2020

Andrei Iancu
*Director of the United States Patent and Trademark Office*